US009780585B2

United States Patent
Chen et al.

(10) Patent No.: US 9,780,585 B2
(45) Date of Patent: Oct. 3, 2017

(54) MOVABLE DEVICE AND METHOD OF CHARGING THE SAME

(71) Applicant: CHIGOO INTERACTIVE TECHNOLOGY CO., LTD., Wuxi (CN)

(72) Inventors: Tao Chen, Wuxi (CN); Weijian Lan, Wuxi (CN); Chuanrong Pan, Wuxi (CN); Hua Zhou, Wuxi (CN)

(73) Assignee: CHIGOO INTERACTIVE TECHNOLOGY CO., LTD. (CN)

( * ) Notice: Subject to any disclaimer, the term of this patent is extended or adjusted under 35 U.S.C. 154(b) by 38 days.

(21) Appl. No.: 14/760,329

(22) PCT Filed: Jan. 3, 2014

(86) PCT No.: PCT/CN2014/070076
§ 371 (c)(1),
(2) Date: Jul. 10, 2015

(87) PCT Pub. No.: WO2014/108046
PCT Pub. Date: Jul. 17, 2014

(65) Prior Publication Data
US 2015/0349557 A1  Dec. 3, 2015

(30) Foreign Application Priority Data
Jan. 10, 2013 (CN) .......................... 2013 1 0009334

(51) Int. Cl.
*H02J 7/04* (2006.01)
*H02J 7/00* (2006.01)
(Continued)

(52) U.S. Cl.
CPC .......... *H02J 7/0045* (2013.01); *B60L 3/0046* (2013.01); *B60L 3/04* (2013.01); *B60L 11/1816* (2013.01);
(Continued)

(58) Field of Classification Search
CPC ........ H02J 7/007; H02J 7/0013; H02J 7/0045; H02J 7/0052; B60L 3/04; B60L 3/0046; B60L 11/1816; B60L 11/1877
See application file for complete search history.

(56) References Cited

U.S. PATENT DOCUMENTS

| | | |
|---|---|---|
| 3,652,103 A | 3/1972 | Higgs |
| 2005/0225305 A1 | 10/2005 | Thrap |

(Continued)

FOREIGN PATENT DOCUMENTS

| | | |
|---|---|---|
| CN | 201345471 Y | 11/2009 |
| CN | 101752889 A | 6/2010 |

(Continued)

OTHER PUBLICATIONS

International Search Report Application No. PCT/CN2014/070076 Completed Mar. 17, 2014; dated Mar. 27, 2014 5 pages.

*Primary Examiner* — Edward Tso
*Assistant Examiner* — Aaron Piggush
(74) *Attorney, Agent, or Firm* — St. Onge Steward Johnston & Reens LLC

(57) ABSTRACT

An apparatus and method for charging movable devices like carts or trolleys. Each movable device includes a charging unit and a charging connector coupled to the charging unit, including a male plug at one end, a female socket at the other end, and two electrodes interconnected. When the devices are in a queue, the male plug of the connector of a device in the rear is connected to the female socket of the same in the front so that a plurality of movable devices are connected to each other in tandem and charged simultaneously. The method includes connecting the plurality of devices in tandem with the respective connectors so that the devices can be charged simultaneously. A plurality of movable devices can be charged simultaneously and the charging
(Continued)

process can be simplified, thereby improving the utilization and safety of the movable devices and reducing the cost of maintenance.

10 Claims, 4 Drawing Sheets

(51) Int. Cl.
*B60L 3/00* (2006.01)
*B60L 3/04* (2006.01)
*B60L 11/18* (2006.01)
*H02J 1/14* (2006.01)

(52) U.S. Cl.
CPC ....... *B60L 11/1864* (2013.01); *B60L 11/1877* (2013.01); *B60L 11/1879* (2013.01); *H02J 7/007* (2013.01); *H02J 7/0013* (2013.01); *H02J 7/0018* (2013.01); *H02J 7/0052* (2013.01); *B60L 2200/24* (2013.01); *B60L 2210/30* (2013.01); *B60L 2240/547* (2013.01); *B60L 2240/549* (2013.01); *H02J 1/14* (2013.01); *H02J 7/0042* (2013.01); *Y02T 10/7005* (2013.01); *Y02T 10/7061* (2013.01); *Y02T 10/7072* (2013.01); *Y02T 10/7241* (2013.01); *Y02T 10/92* (2013.01); *Y02T 90/127* (2013.01); *Y02T 90/14* (2013.01)

(56) References Cited

U.S. PATENT DOCUMENTS

| | | | | |
|---|---|---|---|---|
| 2006/0264120 | A1* | 11/2006 | Perrier | ............... B62B 3/1416 |
| | | | | 439/752 |
| 2011/0084649 | A1* | 4/2011 | Yang | ............... H02J 7/0042 |
| | | | | 320/107 |
| 2011/0133693 | A1* | 6/2011 | Lowenthal | ......... B60L 11/1824 |
| | | | | 320/109 |

FOREIGN PATENT DOCUMENTS

| | | |
|---|---|---|
| CN | 102005797 A | 4/2011 |
| CN | 201839051 U | 5/2011 |
| CN | 202159803 U | 3/2012 |
| CN | 202197136 U | 4/2012 |
| CN | 102437607 A | 5/2012 |
| CN | 203071613 U | 7/2013 |
| CN | 103580297 B | 11/2015 |
| EP | 1153816 A1 | 11/2001 |
| KR | 20110100431 A | 9/2011 |
| KR | 20120031768 A | 4/2012 |
| KR | 101727517 B1 | 4/2017 |
| WO | 2004042681 A1 | 5/2004 |

* cited by examiner

MOVABLE DEVICE AND METHOD OF CHARGING THE SAME

FIELD OF THE INVENTION

The present invention relates generally to movable devices provided with electronic units and, more particularly, to movable devices with rechargeable electronic units and method of charging the same.

BACKGROUND OF THE INVENTION

With the development of business and public services, movable devices like trolley or luggage barrow which facilitate user's carry of luggage and goods have been widely used in public places such as shopping mall, supermarket, and airport, etc. In order to enable users to access more information on consumption or other related information easily and timely, electronic playback devices are installed on the conventional trolley and luggage barrow so that users can get information and merchants can play location information, navigation information, advertising information and other related information. However, since charging of a conventional trolley has to rely on fixed external power plug, the number of trolleys being charged simultaneously is limited by the number of the external power plugs. For a large public place having thousands of trolleys, it is difficult to charge a number of trolleys simultaneously, which is inconvenient.

Furthermore, exposed power port on a trolley or luggage barrow is disadvantageous to the safe use thereof, and liable to cause inconvenience in operation.

In addition, the conventional charging method requires a large number of fixed external power plugs, which causes the management thereof inconvenient and uneconomical.

SUMMARY OF THE INVENTION

Therefore, an object of the present invention is to provide rechargeable movable devices and method of charging the same to solve at least one of the foregoing problems of the prior art.

In one aspect, this invention may provide a method of charging movable devices. Each of the movable devices comprises a body, a charging unit mounted on the body and a charging connector mounted on the body and coupled to the charging unit. The method comprises a step of connecting a plurality of movable devices in tandem with the charging connectors being connected in series, so that the plurality of movable devices can be charged simultaneously. Accordingly, it is not necessary to provide numerous fixed external power supply ports, thereby saving a lot of space and reducing equipment costs.

The method may further comprises a step of detecting by one of the movable devices a power bus current through the charging unit thereof, and controlling a charging current thereof according to the detection so that its following movable devices are charged preferentially.

A load capacity of a DC power is generally limited, and thus the number of movable devices which can be charged simultaneously is limited. According to the method of the invention, when a plurality of movable devices connected in series are charged simultaneously, the movable devices joined later will be charged first, so that the one at the end of the movable devices (like pushcarts or trolleys) being in a queue always has a priority to be charged preferentially. The method is adaptive to the normal situation that a trolley at the end of a queue of trolleys will be taken out for use. Moreover, with the method of the invention, it is not necessary for an administrative staff to worry about the limitation of the number of movable devices to be charged, that is, to worry about whether the load capacity of the DC power supply can provide a sufficient charging current to rechargeable devices.

In some embodiments, the charging connector comprises an insulated housing, a male plug at one end and a female socket at the other end of the insulated housing, both having an electrode respectively, and an electrode slice provided inside the housing and electrically connected between a pair of the male plug and the female socket.

When a plurality of movable devices are in a queue, the male plug of the connector of a movable device in the rear is coupled to the female socket of the connector of a movable device in the front so that the charging units of the plurality of devices are connected in tandem and charged. In this way, the plurality of devices can be charged simultaneously with only an external power supply port, which has a good economical efficiency.

In some embodiments, the charging unit comprises a bus current detection unit, and the method comprises a step of cutting off the charging current in the charging unit of a movable device when it is detected by the bus current detection unit that the bus current of the charging unit of the movable device reaches or approaches a load current limit of the DC power. Therefore, the last one in a queue of movable devices is always charged preferentially, so that the last movable device would have been powered as sufficient as possible when it was taken out for use, which eliminates the administrative staff's worry about whether the load capacity of DC power can provide a sufficient charging current to rechargeable devices, namely, a worry about the limitation of the number of movable devices to be charged.

In a further aspect, the present invention may provide a movable device comprising a body, a charging unit mounted on the body, and a charging connector mounted on the body and coupled to the charging unit. The charging connector comprises a male plug at one end, a female socket at the other end, and two electrodes interconnected each other and located inside the connector. When movable devices are in a queue, the male plug of the connector of a movable device in the rear is coupled to the female socket of the connector of a movable device in the front so that the plurality of devices are connected in tandem and charged.

With the plurality of movable devices such as trolleys being connected in series simultaneously, the trolleys can be stacked compactly in a queue and charged simultaneously, conveniently. Moreover, a movable device (like a pushcart or trolley) stacked subsequently is always charged preferentially according to the LIFO (Last In First Out) arrangement in a simultaneous charging, thereby facilitating a simultaneous charging and using of a large number of movable devices in public places.

BRIEF DESCRIPTION OF THE DRAWINGS

Some embodiments of the present invention will be described by way of example with reference to the accompanying figures, wherein.

DETAILED DESCRIPTION OF THE INVENTION

For illustrating and understanding purpose, the following embodiments will be described taking trolley as an example of movable device. It will be understood for those skilled in the art that the embodiments of the invention are applicable to any other movable device similar to trolley.

Figure 1:
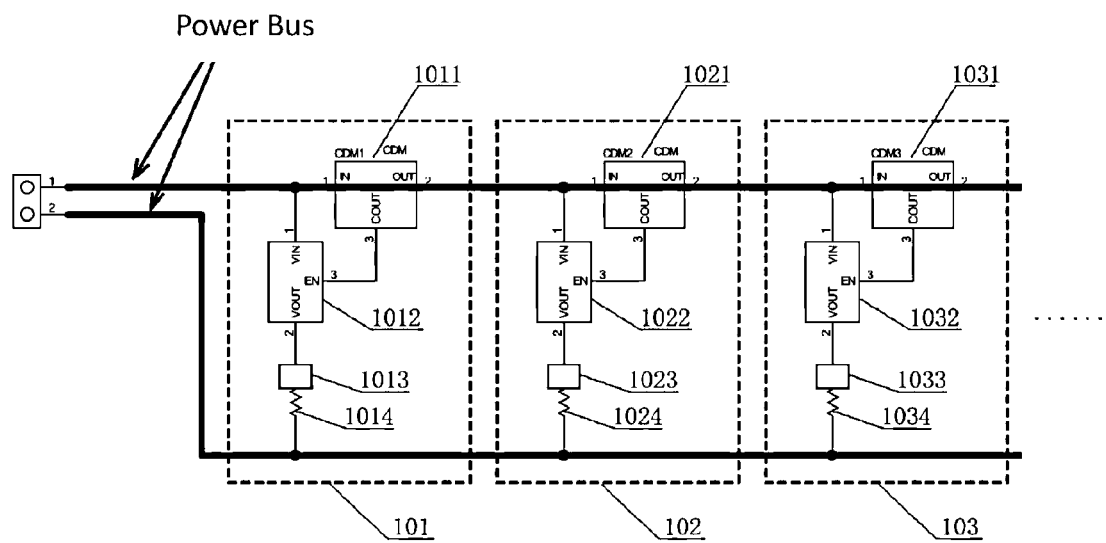
FIG. 1 shows a schematic view of a method of charging trolleys simultaneously according to an embodiment of the invention.

FIG. 1 shows a schematic view of a method of charging movable devices (e.g. trolleys) simultaneously according to an embodiment of the invention. As shown in FIG. 1, each block 101, 102, 103, etc. represents a charging unit of a trolley. Each of the charging units comprises a bus current detection unit 1011, 1021, 1031, etc., a controlled DC voltage unit 1012, 1022, 1032 etc., a cell charging management circuit 1013, 1023, 1033, etc., and a rechargeable battery 1014, 1024, 1034, etc. Each unit may have the same configuration. The rechargeable battery may be lithium battery.

For example, charging unit 101 comprises bus current detection unit 1011 which can be implemented conventionally. For instance, the current detection unit may consist of a Hall current sensor, an MCU having an A/D input end and a peripheral circuit. Two pins (IP+, IP−) of the Hall current sensor for connecting the external current path to be measured are connected in series between a male plug and a female socket of a same electrode (positive or negative) of a power bus for charging the present trolley. In this case, the male plug and the female socket which are connected to metal electrodes of the Hall current sensor must be disconnected. The Hall current sensor, by detecting the bus current therethrough, outputs a voltage corresponding to the magnitude of a detected power bus current from the isolated output ports of the sensor, which is input into an A/D input end of the MCU and then converted by an A/D conversion circuit of the MCU to be further processed by a conventional processing program, thus obtaining a specific value of current through the power bus for charging this trolley.

The detected value of current running through the power bus of the unit of the current trolley is the total charging power current through all trolleys behind this trolley.

When the current value detected is very close to a limit current of the power supply, an overload protection for the power supply will be caused if the charging unit of the current trolley is still supplied with power, and thus all trolleys in tandem cannot be charged. MCU will then output a control signal through an I/O port connected to an EN control input of a controlled DC voltage unit to turn off the DC voltage unit to stop its operation. As a result, the power of the charging unit of this trolley will be cut off to ensure the charging power supply for all trolleys behind it.

When the value of the power bus charging current of the trolley obtained by MCU is lower than a preset value, that is, the number of the following trolleys (accordingly, the total charging current) does not reach a preset threshold which may be a threshold of the total output current of the charging power minus a rated charging current of the current trolley, and thus the overload protection of the charging power will not caused by a superposition of the charging current of the current trolley, MCU will output a control signal through I/O port coupled to EN control input of the controlled DC voltage unit, to start the DC voltage unit to operate in voltage reduction mode, so that a charge management unit of the current trolley will be provided a +5V power, and then charge of this trolley begins.

The Hall current detecting element can use products of ALLEGRO Co., the specific model thereof may be determined according to a maximum current which can be provided by the DC power for charging. When the maximum current is 40 A, for example, ACS758LCB-050B-PFF-T of series ACS758XCB of this company can be elected and the range of the detected current value thereof is −50 A to +50 A. MCU can choose an RL78 series chip with an A/D input port of RENESAS.

Furthermore, the current detection unit may also be implemented by a high precision voltage comparator and its peripheral circuits. When the trolleys are concatenated and charged simultaneously, two metal electrodes (positive and negative) are disposed at the bottom of each trolley for supplying power thereto. Each of the metal electrodes has a male plug and a female socket. There is a certain distance between the male plug and the female socket of a same electrode, thus forming a certain inherent resistance. When a large current runs through the electrodes, there is a certain voltage difference between the male plug and the female socket of a same electrode. It is thus possible to determine indirectly the bus current of the electrode by detecting and comparing a voltage between a male plug and a female socket of a same electrode. The inherent resistance of an electrode is finite, and thus even if a large current passes a same electrode of a same trolley, a voltage difference between two ends of this electrode (the male plug and the female socket) is very low with respect to the power bus. Therefore, a high precision voltage comparator may be preferably used. Two ends of an electrode (a male plug and a female socket) are coupled to two inputs of a comparator through a peripheral circuit thereof respectively, and then EN input of the controlled DC voltage conversion is controlled by a signal output from the comparator. In this way, it is also possible to control, by the bus current detection, the power supply to the charging unit of the current trolley.

In this embodiment, the male plug of the charging connector of the first trolley is inserted into a matched female socket (such as 1500 W, 2000 W or 3000 W) of an AC/DC conversion unit to be connected to the power supply therethrough.

The input of controlled DC voltage unit 1012 is coupled to an electrode of the batch charging power bus near the male plug. Rechargeable battery 1013 is connected between the voltage output of controlled DC voltage unit 1012 and another electrode of the power bus near the female socket. The controlled DC voltage unit 1012 may be implemented by a DC voltage conversion chip having an EN control port which is capable of operating in a wide range of input voltage and providing a large load current together with its periphery circuit. Alternatively, the controlled DC voltage unit 1012 may also implemented by a DC voltage controller having an EN control port which is capable of operating in a wide range of input voltage and providing a large load current together with its periphery circuit.

A specific range of working voltage of the voltage conversion chip or the voltage conversion controller of the DC voltage unit is determined according to the actually chosen output voltage of the DC power in the front end of the power supply. For example, the output voltage of the DC power may be elected from DC7.5V, DC12V, DC24V and DC27.5V. Where the maximum continuous load current for charging a single trolley is about 4.2 A/5V, a DC conversion chip having input voltage of DC5.5V~DC 36V may be used, with its continuous output load current reaching at least 5 A and its output voltage being adjustable in a certain range. Some voltage conversion chips may be implemented by, e.g., TPS540 of TI Co. or RT8279 of RICHTEK Co.

The charging management circuit may be implemented by a lithium battery charging management IC with a charging process control, such as an HB6293A series chip of SHENZHEN HUATAI ELECTRONICS Co. Such chips integrate management and control of all charging processes necessary for charging a lithium battery, including management and control of the processes of pre-charge, constant current charge, and constant voltage charge, etc.

It can be seen from the FIG. 1 that the circuit consisting of the charging units of respective trolleys is connected in parallel between the two electrodes of the power bus in the batch charging method of the invention.

Figure 2:
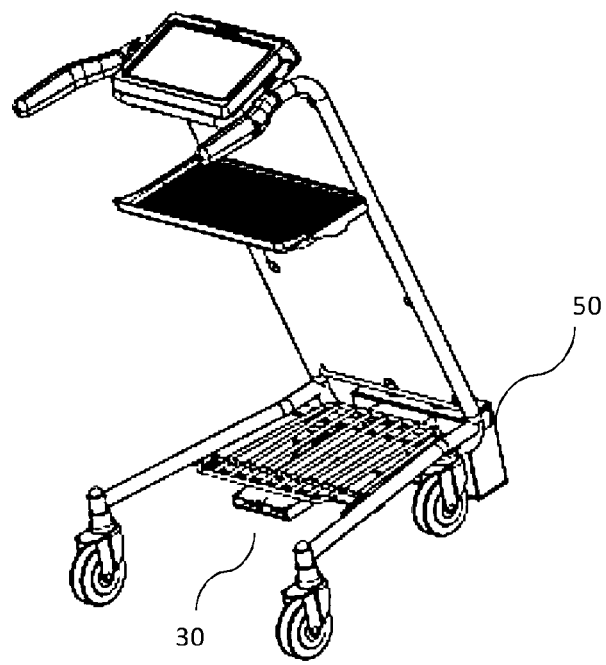
FIG. 2 shows a schematic view of a trolley with an electronic unit according to an embodiment of the invention.
Figure 3:
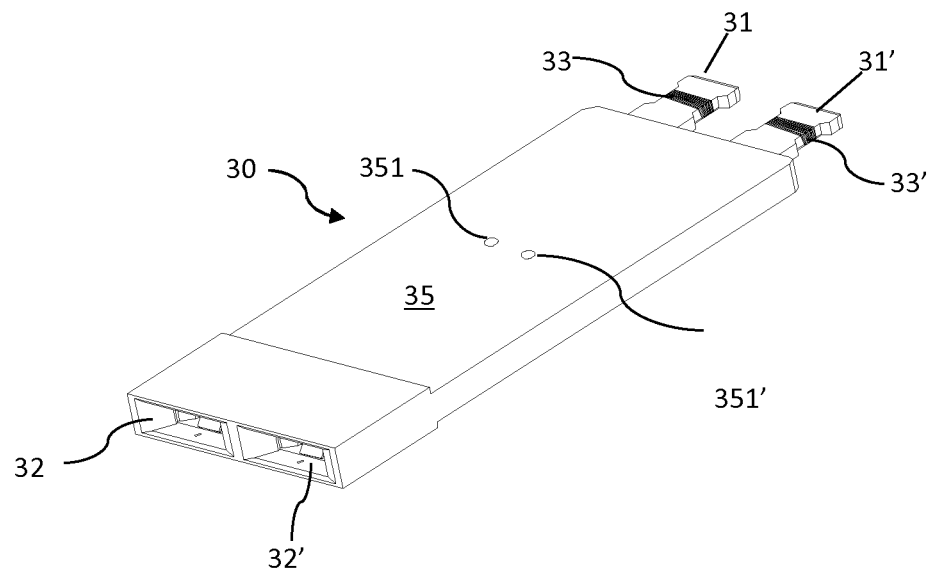
FIG. 3 shows a schematic view of a charging connector according to an embodiment of the invention.

FIG. 2 shows an embodiment of a trolley with a charging connector being mounted at the bottom thereof. FIG. 3 shows the embodiment of the charging connector of this trolley.

As shown in FIG. 3, the charging connector 30 comprises insulated housing 35, two male plugs 31 and 31', and two female sockets 32 and 32'. Electrode 33 is provided on male plug 31, and electrode 33' is provided on male plug 31'. Meanwhile, female socket 32 or 32' has an open having a shape corresponding to the shape of male plug 31 or 31' to accommodate the plug. The conductive wire of the charging unit accesses charging connector 30 through ports 351 and 351' formed on housing 35.

Figure 4:
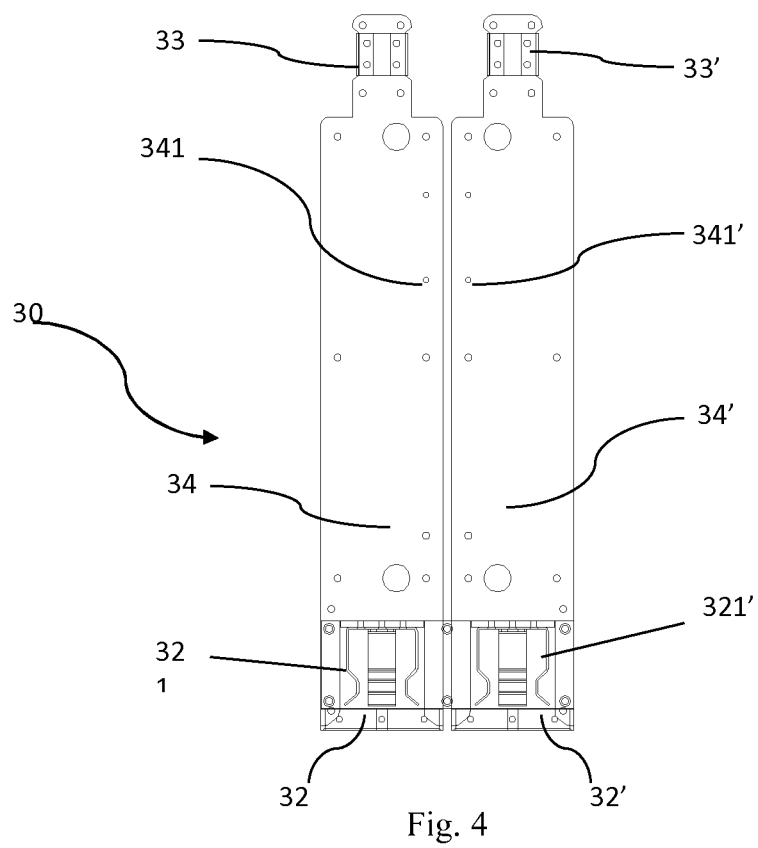
FIG. 4 shows a schematic view of the inner configuration of the charging connector shown in FIG. 3.

FIG. 4 shows a schematic view of the inner configuration of charging connector 30. As shown in the drawing, two copper-plated electrode slices 34 and 34' being insulated from each other are formed within housing 35 of charging connector 30. Copper-plated electrode slice 34 is connected at one end to electrode 33, and at another end to reed electrode 321 for trilateral contact. Copper-plated electrode slice 34' is connected at one end to electrode 33' and at another end to reed electrode 321' for trilateral contact. Each of reed electrodes 321 and 321' comprises a bottom end connected to the copper-plated electrode slice and elastic reeds extending from the middle portion and two sides of the bottom end, respectively. Three elastic reeds of reed electrode 321 match with electrode 33 of male plug 31, so that when the male plug on the charging connector of another trolley is inserted into the female socket of the current trolley, three reed electrodes clamp the electrode of the male plug inserted therein to form an electric connection. Electrodes of two male plugs 31 and 31' are insulated from each other, and so are the electrodes of two female sockets 32 and 32'.

Connecting screw holes 341 and 341' are provided on copper-plated electrode slices 34 and 34' for insertion of the conductive wire of, e.g., a charging unit 101. Connecting screw holes 341 and 341' communicate with ports 351 and 351' of housing 35 to allow insertion of conductive wires.

The interior of charging connector 30 and housing 35 are preferably integrated, so that the charging connector can be stronger.

It can be understood for those skilled in the art that, although electric connections among trolleys are formed by connecting their charging connectors in series so as to make the power buses to be connected in series, the charging units of the trolleys are connected in parallel between the charging power buses (as shown in FIG. 1) connected in series. The charging power bus section of a trolley is a connection node for connecting the power supply to the charging unit of this trolley. Such a connection of several trolleys in series actually makes several individual charging units connect to the power buses in parallel.

Figure 5:
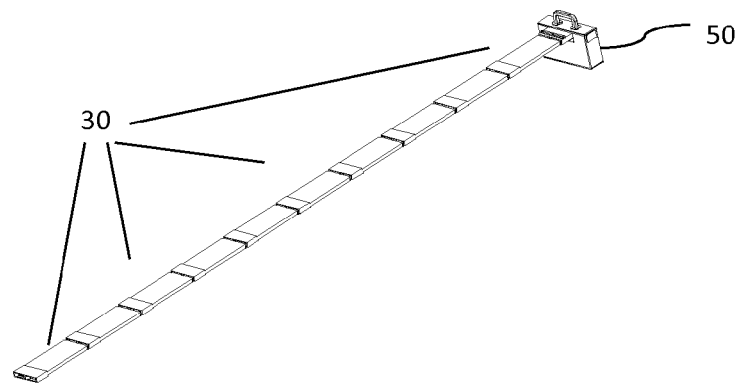
FIG. 5 shows a schematic view of a connection between the charging connectors connected in series, showed in FIG. 3, and the external charging power.

FIG. 5 is a schematic view showing that charging connectors of several trolleys connected in series and coupled to the power supply port when these trolleys are connected to each other in tandem. In FIG. 5, the power supply port is connected with charging connector 30 of the first trolley through a conventional AC/DC conversion unit 50 (such as 1500 W, 2000 W or 3000 W).

Figure 6A:
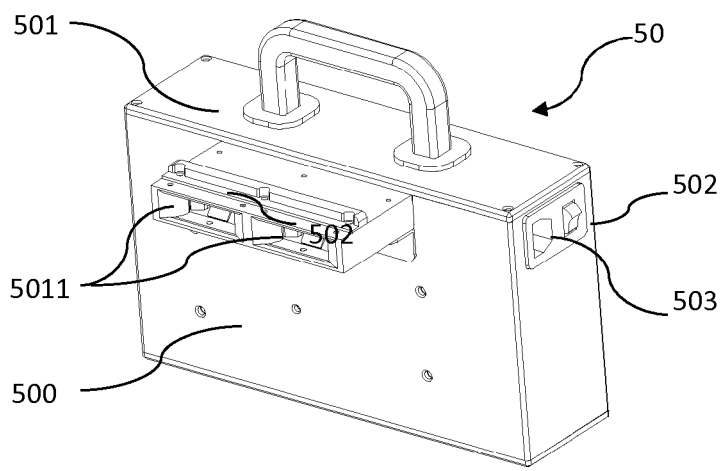
FIGS. 6A and 6B show a schematic view of an AC-DC conversion unit used in a method of simultaneous charging according to an embodiment of the invention.
Figure 6B:
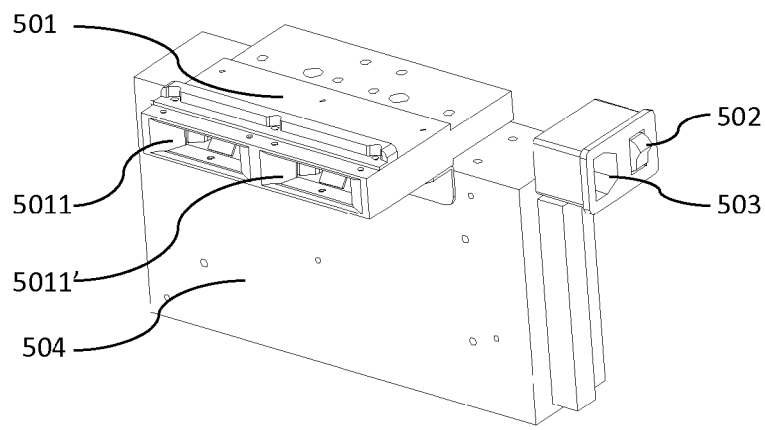

FIGS. 6a and 6b show a schematic view of an external configuration of AC/DC conversion unit 50. FIG. 6a shows the unit with a shell 500, while FIG. 6b shows the unit without shell 500. As shown in the drawings, unit 50 further comprises a female socket 501, an AC/DC conversion module 504, a switch 502, and an indicator light 503, etc. AC/DC conversion module can use the commercially available products such as SP-320 series of TAIWAN MINGWEI Co. having a maximum power output of 320 W, and a DC output voltage of DC7.5V, DC12V, DC24V or DC27.5V. The detailed description of this unit is omitted for the sake of avoiding unnecessary obscuring of the substance of the invention.

Figure 7:
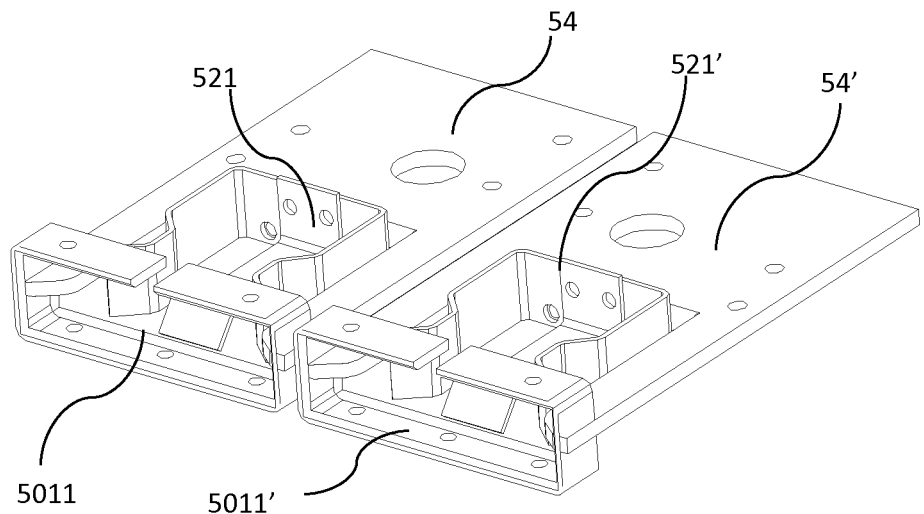
FIG. 7 shows a schematic view of female sockets of the AC-DC conversion unit shown in FIG. 6.

Female socket 501 may have the same structure as the female socket of charging connector 30, as shown in FIG. 7. Female socket 501 has opens 5011 and 5011' corresponding to the shape of the male plug of the charging connector to accommodate the male plug. Reed electrodes 521 and 521' having the same structure as reed electrode 321 in the female socket of charging connector 30 are disposed in two opens 5011 and 5011' respectively. Reed electrodes 521 and 521' are coupled to the DC output of AC/DC conversion unit 50 respectively through copper-plated electrode slices 54 and 54' which are insulated from each other.

The method of batch charging according to an embodiment of the present invention will be described.

Figure 8:
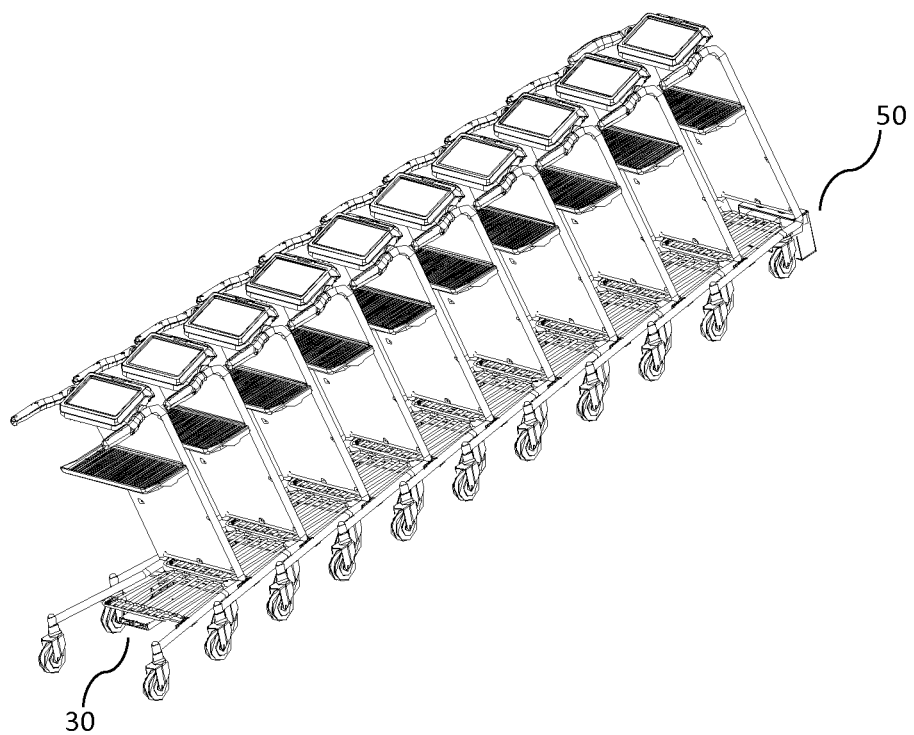
FIG. 8 shows a schematic view of stacking trolleys in a queue in a method of simultaneous charging according to an embodiment of the invention.

When a plurality of trolleys are connected in tandem for charging (charging a single trolley shares the same principle), the current detection unit of each trolley will detect the current of the power bus at the bottom of this trolley. As shown in FIG. 8, the electrode (charging connector) is mounted at the bottom of the trolley, that is, the power bus is disposed at the bottom of the trolley.

The bus current detection unit controls the operation status of its DC voltage conversion unit according to the detection of the power bus current. In this embodiment, an indicator "load limit current" is used. This indicator refers to the maximum load current which can be provided by the output of the DC power. When an actual load current is less than or equal to the maximum load current of this power supply, the DC power can supply power for the load. When the actual load current is bigger than the maximum load current which can be provided by the power supply, the overload protection will be started in the power supply. Then, the power supply will be shut off so that the load is powered off and cannot be charged. According to the method shown in FIG. 1, the biggest power bus current will be detected in the charging unit nearest to the DC power. When the power bus current of the bottom of the trolley detected by its bus current detection unit reaches or quite approaches the load limit current of 32V DC power in the front, the DC voltage conversion chip of this trolley will be shut off and the charging current thereof will be cut off temporarily, so that its following trolleys can be provided with enough charging current.

The charging process is managed and controlled automatically by the charging management chip according to the preset parameters. Different charging management chips may have different preset value. For instance, when the voltage of the battery is lower than 3v, the charging management chip may normally operate in a pre-charging state, and the charging current may be controlled to be about 20% of the charging current of constant current charging by changing the parameters of the peripheral circuit of the charging management chip. When the battery voltage is charged to be higher than 3V, the charging management chip will shift to the constant current charging process automatically. In the constant current charging process, the charging current is kept constant and the magnitude thereof can be preset by setting relevant parameters of the peripheral circuit of the charging management chip, When the battery voltage is charged to a preset full voltage (a preset value of lithium battery may be 4.2V), the charging management chip will shift to the constant voltage charging process automatically. In the constant voltage charging process, the charging voltage is constant and the charging current is declined gradually along with the charging process. When the constant voltage charging current is down to about 10% of the constant current charging current, the charging management chip will shift to a stop status and thus the charging process is finished.

When a power bus charging current of a trolley detected by the current detection unit of the trolley reaches or is very close to the load limit of the power supply, this current detection unit will output a corresponding signal to shut off the DC voltage unit of this trolley, and the charging current of this trolley will be cut off for the moment, so as to ensure that all trolleys behind this trolley can get sufficient current for charging themselves. If, however, the DC voltage conversion chip of this trolley is started to supply power for the charging management circuit thereof at this time, that is, to charge this trolley, the charging current thereof will be superimposed to the total charging current of all the trolleys behind this trolley, which will render the bus current exceeding the load limit of the DC power. Under such a situation, the overload protection of the DC power is triggered and the power supply is shut off, causing a failure of charging for all trolleys connected to be charged.

After the charging of trolleys behind this trolley shifts to the constant voltage charging process, the bus current of this trolley will be declined in succession. The charging current of all trolleys behind this trolley runs through metal electrodes of the power bus of this trolley, thus the change of charging current of the trolleys in the rear can be detected by the bus current detection unit of the trolley in the front. During the constant current charging process, the current of the power bus running through the front trolley has no change, whilst during the constant voltage charging process of a certain trolley, the charging current will be declined gradually along with the charging process and the charging thereof will be detected by the bus current detection unit of the trolley in front of this trolley.

When the power bus current (not the charging current) of this trolley detected by the bus current detection unit thereof lowers to a current being capable of charging this trolley, this bus detection unit will output a corresponding signal to control the DC voltage conversion thereof to operate in a DC voltage reduction conversion state, so that the charging management circuit (as indicated by reference sign 1013, 1023 or 1033 in FIG. 1) is provided with a +5V power to control the process of battery charging. Charging management circuits 1012, 1023 and 1033 in FIG. 1 can be disposed inside an electronic equipment of the armrest portion of the trolley for control of the power supply to the rechargeable battery of this trolley.

The foregoing description and illustration on some embodiments of the invention are an example and the invention is not limited to the exact details shown or described. Any equivalent changes to the above disclosure made by those skilled in the art using technical means available should fall into the scope of the protection of the invention.

For example, in other embodiments, AC/DC conversion unit 50 can output 5V to 6V directly so that lithium battery can be charged directly. In this way, the DC voltage reduction chip with EN is not necessary for each trolley, which can be replaced with a controlled electronic switch.

The invention claimed is:

1. A method of charging movable devices, each of said movable devices comprising a body, a charging unit mounted on the body, and a charging connector mounted on the body and coupled to the charging unit, said method comprising:
   connecting a plurality of movable devices in tandem through the charging connectors to charge the devices in batches; and
   detecting by one of said moveable devices a power bus current running through the charging unit thereof, and controlling a charging current therefor according to the detected current, so that the last one of its following movable devices is first charged.

2. The method of claim 1, wherein the charging connector comprises a male plug at one end, a female socket at the other end, and two electrodes inside the connector, wherein when a plurality of movable devices are in a queue, the male plug of the connector on a movable device in the rear is connected to the female socket of the connector of a movable device in the front so that the plurality of devices are coupled to each other in tandem and charged.

3. The method of claim 1, wherein the charging unit comprises a bus current detection unit, and the method comprises:
   when it is detected by a bus current detection unit that the bus current of the charging unit of the movable device reaches or approaches a load current limit of a DC power, the charging current of the charging unit of the device is cut off.

4. The method of claim 1, wherein the current of the power bus running through the charging unit of a movable device is the current of the power bus running through charging unit of all movable devices behind it.

5. The method of claim 3, wherein the bus current detection unit detects the bus current through a Hall current sensor, or determines the magnitude of the bus current on said electrodes by detecting and comparing a voltage between a male plug and a female socket of a same electrode.

6. A movable device comprising:

a body;

a charging unit mounted on the body; and a charging connector mounted on the body and coupled to the charging unit, said charging connector being capable of being coupled with the charging units of other movable devices, so that a plurality of movable devices are connected in tandem through the charging connectors to charge the devices in batches;

wherein the charging unit comprises a bus current detection unit for detecting a power bus current in the charging unit and controlling the charging current of the movable device according to said detection to charge the last one of its following movable device firstly.

7. The movable device of claim 6, wherein the charging connector comprises:

an insulated housing;

a male plug at one end and a female socket at the other end of the insulated housing, both said male plug and female plug having an electrode respectively; and an electrode slice provided inside the housing and electrically connected to a pair of the male plug and the female socket respectively, wherein when the movable devices are connected in a queue, the male plug of the charging connector on the movable device in the rear is connected to the female socket on the device in the front, so that a plurality of the movable devices are cascaded for charging.

8. The movable device of claim 7, wherein each of the female sockets comprises a reed electrode comprising a bottom end electrically connected to the electrode slice, and elastic reeds extending from the middle portion and two sides of the bottom end, respectively, wherein the elastic reed matches with the male plug's electrode, so that when the male plug of another charging connector is inserted into said female socket, the reed electrode clamps the electrode of the male plug inserted therein to form an electric connection therebetween.

9. The movable device of claim 6, wherein the charging unit further comprises a controlled DC voltage reduction unit which receives a control signal from the bus current detection unit and provides a charging current to a rechargeable battery according to the control signal.

10. The movable device of claim 9, wherein the charging unit further comprises a battery charging management circuit for management of the power to the battery.

* * * * *